(12) United States Patent
Rune et al.

(10) Patent No.: US 7,146,175 B2
(45) Date of Patent: Dec. 5, 2006

(54) UPLINK LOAD DETERMINATION AND SIGNALING FOR ADMISSION AND CONGESTION CONTROL

(75) Inventors: Göran Rune, Linköping (SE); Gunnar Bark, Linköping (SE); Niclas Wiberg, Linköping (SE); Fredrik Gunnarsson, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 528 days.

(21) Appl. No.: 10/419,270

(22) Filed: Apr. 21, 2003

(65) Prior Publication Data

US 2004/0209624 A1 Oct. 21, 2004

(51) Int. Cl.
*H04Q 7/20* (2006.01)
(52) U.S. Cl. .................. 455/453; 455/436; 455/437; 455/438
(58) Field of Classification Search .............. 455/436, 455/437, 438, 439, 440, 441, 442, 443, 445
See application file for complete search history.

(56) References Cited

U.S. PATENT DOCUMENTS

| | | | | |
|---|---|---|---|---|
| 5,862,487 | A * | 1/1999 | Fujii et al. | 455/454 |
| 5,956,641 | A * | 9/1999 | Bruckert et al. | 455/442 |
| 6,233,222 | B1 | 5/2001 | Wallentin | |
| 6,459,901 | B1 * | 10/2002 | Chawla et al. | 455/450 |
| 7,003,290 | B1 * | 2/2006 | Salonaho et al. | 455/423 |
| 2001/0036823 | A1 | 11/2001 | Van Lieshout et al. | |
| 2002/0094834 | A1 * | 7/2002 | Baker et al. | 455/522 |
| 2004/0121743 | A1 * | 6/2004 | Rudolf et al. | 455/115.1 |

FOREIGN PATENT DOCUMENTS

| | | |
|---|---|---|
| WO | WO 0035226 | 6/2000 |
| WO | WO 004306 | 1/2004 |

OTHER PUBLICATIONS

Fredrik Gunnarsonn et al., "Uplink Admission Control in WCDMA Based on Relative Load Estimates," Control & Communication, Dept. of Electrical Engineering, Feb. 22, 2002, www.http://www.control.isy.liu.se.*
Fredrik Gunnarsson et al., "Uplink Admission Control in WCDMA Based on Relative Load Estimates," Control & Communication, Dept. of Electrical Engineering, Feb. 22, 2002, www.http://www.control.isy.liu.se.
Erik Geijer Lundin, et al., "Uplink Load Estimation in WCDMA," Division of Communication Systems, Dept. of Electrical Engineering, Linköping, Sweden.
Niclas Wiberg et al., "Uplink Packet Access Control in WCDA," Ericsson Radio Systems AB, Linköping, Sweden.
IPRP mailed Nov. 3, 2005 and Written Opinion of the International Searching Authority mailed Jul. 15, 2004 in corresponding PCT Application PCT/SE2004/000581.
International Search Report dated Apr. 30, 2004.

* cited by examiner

*Primary Examiner*—Duc Nguyen
*Assistant Examiner*—Mazda Sabouri
(74) *Attorney, Agent, or Firm*—Nixon & Vanderhye P.C.

(57) ABSTRACT

A serving RNC signals the load contribution of all mobiles for which it is the serving RNC to all cells controlled by another RNC that are affected by the uplink transmissions of those mobiles. This allows the other RNC to determine the contribution of those mobiles to the total uplink interference in its cells. In one example, the uplink load maybe estimated using mobile-based path gain measurements.

25 Claims, 5 Drawing Sheets

UPLINK LOAD DETERMINATION AND SIGNALING FOR ADMISSION AND CONGESTION CONTROL

BACKGROUND AND SUMMARY

The present invention relates to cellular radio communications and finds particularly advantageous application to third generation, wideband code division multiple access (WCDMA) cellular radio communications systems.

In cellular radio communication, admission and congestion control for each cell are used to maintain acceptable quality of service for existing mobile user connections in those cells. Admitting too many new connections may result in increased interference between the mobile user connections degrading the quality of service. In such a situation, congestion control mechanisms in the radio access network may discontinue service or reduce the quality of service of some connections. The goal therefore is to admit a new mobile user connection only if there are available resources sufficient to satisfy its service requirements.

One admission control strategy is to set a limit on the number of mobile user connections and to admit a new user only if the total number of users is below that limit, sometimes referred to as "hard capacity." An alternative is to base admission control on measurements or estimates relating to the actual load of the system, sometimes referred to as "soft capacity." Soft capacity procedures maybe based on interference measurements. In the uplink direction from mobile to base station, the interference includes both background noise as well as total received power from the transmitting mobiles. The more mobile users transmitting, the more interference, and the higher the uplink load is in that base station's cell.

Interference at the base station is caused both by transmitting mobiles located in that base station cell as well as transmitting mobiles located in other cells, particularly nearby cells. Thus, admission control would be more accurate if it could be based on both intra-cell uplink interference and inter-cell uplink interference. A difficulty here is that neither the intra-cell uplink interference nor the inter-cell uplink interference can be directly measured with reasonable complexity and sufficient accuracy.

Path gain measurements made (directly or indirectly by the mobiles can be used to estimate intra-cell uplink interference and inter-cell uplink interference. Mobile's are normally ordered by the network to often send some type of measurement report to the radio network that includes path gain values (or values from which path gain can be calculated) relating to pilot signals received from nearby base stations. From these path gain measurements, the interference level in a cell can be estimated that takes into account intra-cell uplink interference and inter-cell uplink interference.

An obstacle to using mobile user measurement reports relates to the practice of mobiles only sending such reports to their respective "serving" radio network controller (SRNC). The serving RNC is the RNC that establishes the mobile user connection. In other words, the mobile radio is in a cell controlled by that RNC when the connection is initiated and established. If the mobile user moves to another cell "X" controlled by another RNC, referred to as a drift RNC (DRNC), the mobile's measurement report is nevertheless still directed to the SRNC.

Because the drift RNC lacks the benefit of the information contained in this drifting mobile's measurement report, it cannot formulate a comprehensive determination of the intra-cell and inter-cell uplink interference caused by the uplink transmissions of such drifting mobiles. Without the measurement reports, the drift RNC does not know what impact mobile transmissions from drifting mobiles will have on the uplink load in cell X. A similar problem exists for a mobile that may not have drifted to another RNC's cell, but is still close enough to generate measurement reports relating to one of the other RNC's cells, e.g., cell "Y." Those measurement reports are sent to the serving RNC but not to the other (cell Y's) RNC. The other RNC therefore does not know what impact that mobile's uplink transmission has on cell Y's total uplink interference load.

One way to solve this problem is for all RNCs to receive all mobile measurement reports. But this would create an enormous and largely unnecessary signaling load. A more efficient approach is for the serving RNC to signal the load contribution of all mobiles for which it is the serving RNC to all cells controlled by another RNC that are affected by the uplink transmissions of those mobiles. This allows the other RNC to determine the contribution of those mobiles to the total uplink interference in its cells. The other RNC can then perform admission or congestion control in one or more of its affected cells using the determined uplink load contribution information.

The serving RNC may receive measurement reports from one or more of the mobile radios periodically, upon the occurrence of an event, or in response to a request from the serving RNC. The measurement reports may include path gain information. The path gain information may be path gain values or values from which path gain values may be determined. Other uplink load measurement parameters may be employed in the uplink load estimation, e.g., mobile UE activity level, target signal quality such as target carrier-to-interference ratio, etc.

BRIEF DESCRIPTION OF THE DRAWINGS

The foregoing and other objects, features, and advantages of the present invention maybe more readily understood with reference to the following description taken in conjunction with the accompanying drawings.

DETAILED DESCRIPTION

In the following description, for purposes of explanation and not limitation, specific details are set forth, such as particular example embodiments, hardware, techniques, etc. in order to provide a thorough understanding of the present invention. However, it will be apparent to one skilled in the art that the present invention may be practiced in other embodiments that depart from these specific details. For example, the embodiments described below are set in the non-limiting context of a third generation, WCDMA based cellular radio communications system. However, the invention is applicable to other types of cellular radio communications systems.

In other instances, detailed descriptions of well-known methods, interfaces, devices, and signaling techniques are omitted so as not to obscure the description with unnecessary detail. Moreover, individual function blocks are shown in some of the figures. Those skilled in the art will appreciate that the functions maybe implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
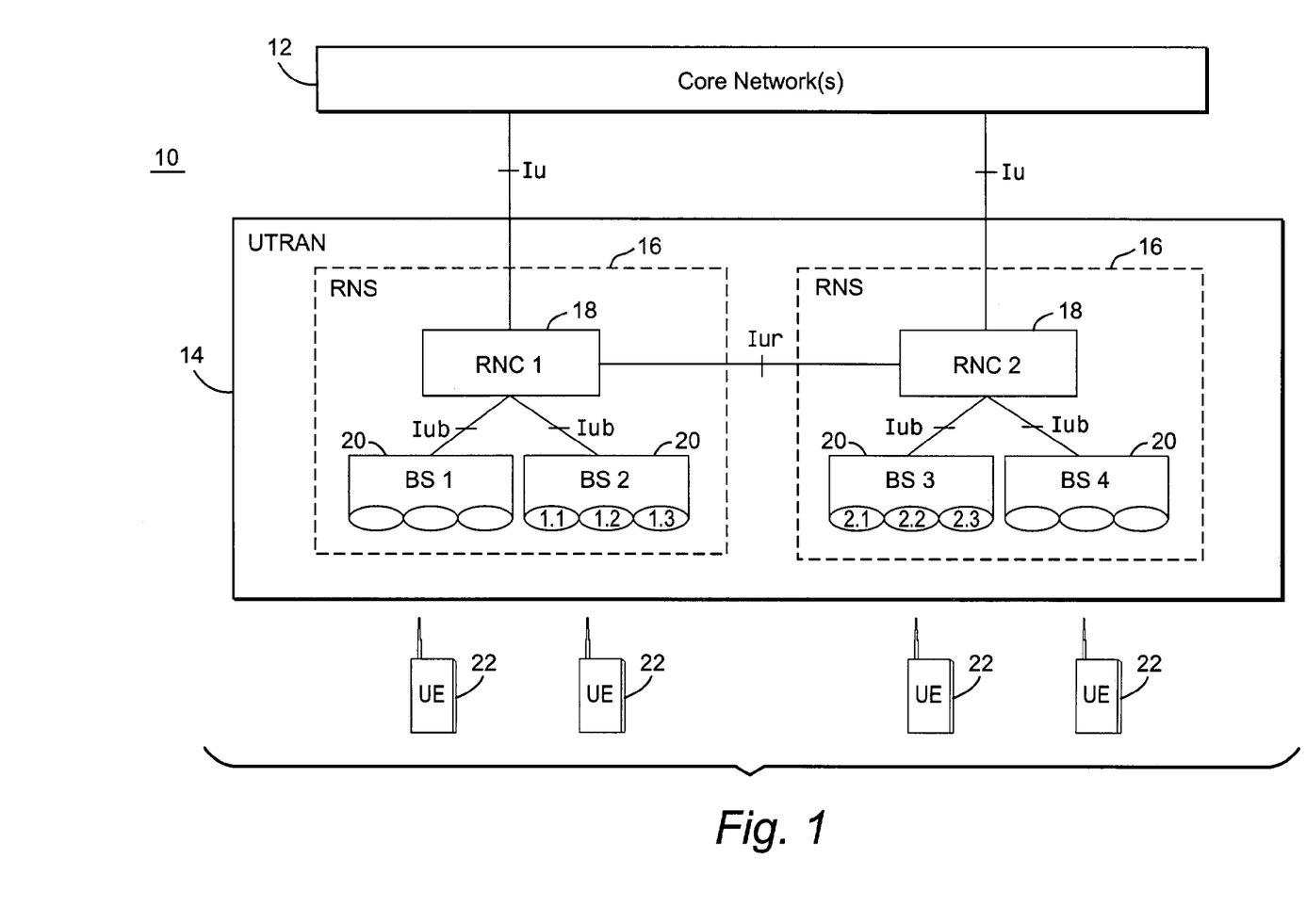
FIG. 1 illustrates an example cellular communications system.

FIG. 1 illustrates a third generation, WCDMA-based cellular radio communication system 10. The User Equipment (UE) 22 is the mobile radio terminal by which a user/subscriber can access services offered by the operator's Core Network(s) 12. The UMTS Terrestrial Radio Access Network (UTRAN) 14 is responsible for the establishment and control of radio connections with the mobile UEs. The Radio Network Subsystem (RNS) 16 controls a number of Base Stations (BSs) 20 in the UTRAN 14. Each base station 20 coordinates radio communications in one or more cells. A cell covers a geographical area and is identified by a unique identity broadcast in the cell by its base station. There may be more than one cell covering the same geographical area.

Figure 2:
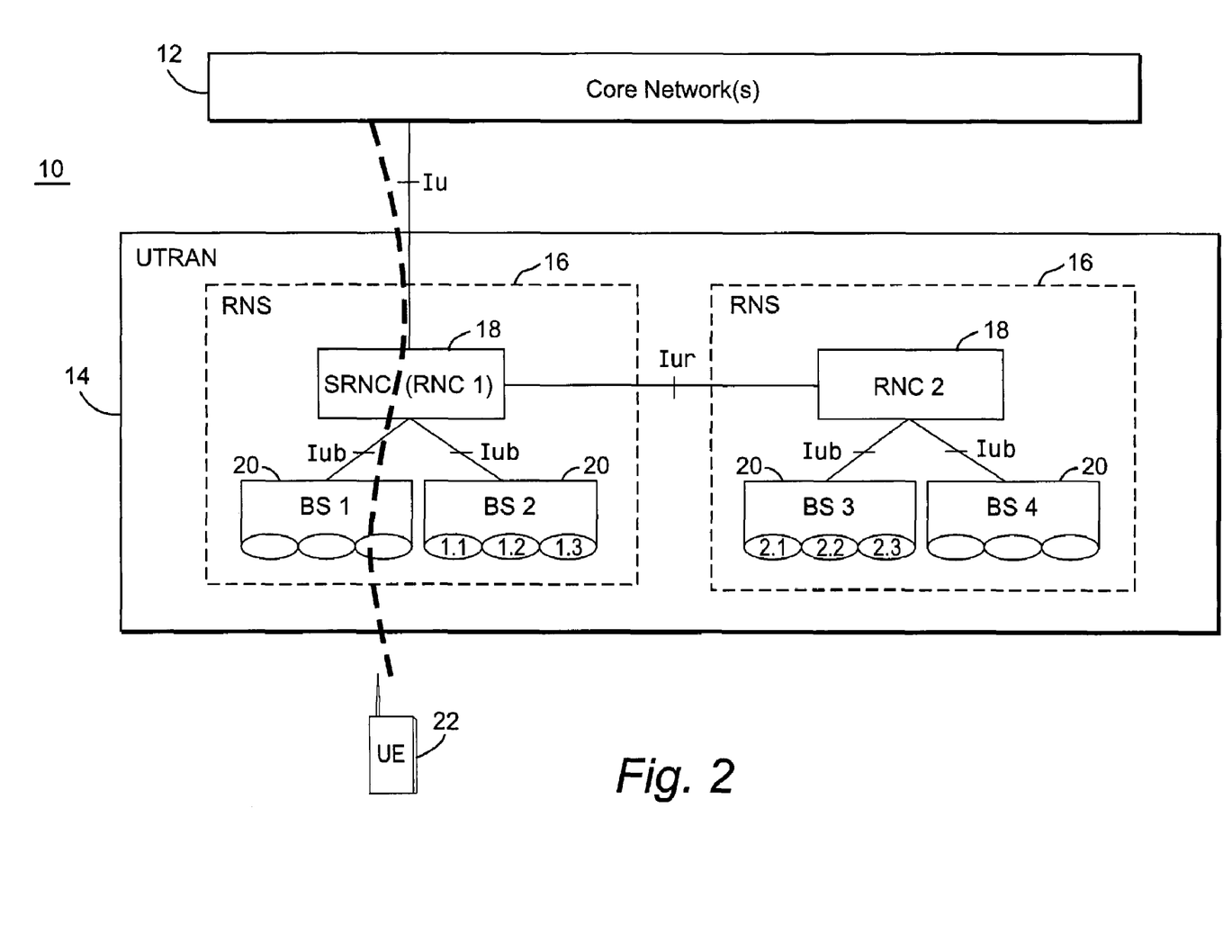
FIG. 2 illustrates an example cellular communications system in which a connection is established with a mobile user via a serving RNC.

In FIG. 1, each base station 20 includes three cells. Base station BS2's cells are labeled 1.1, 1.2, and 1.3, and base station BS3's cells are labeled 2.1, 2.2, and 2.3 for use in a subsequent example. Each Radio Network Controller (RNC) 18 controls radio resources and radio connectivity within a set of cells. A radio link such as that shown in FIG. 2, represents the communication between a mobile UE and one cell in the UTRAN 14, which in FIG. 2 is the third cell associated with base station BS1.

FIG. 1 shows interfaces connecting the different nodes in the UTRAN 14. The Iu interface is defined between the core network 12 and the UTRAN 14. The Iur interface is defined for communications between RNCs 18. The Iub interface is defined for communications between the RNC 18 and its base stations 20. User data is transported on transport bearers over these interfaces. Depending on the transport network used, these transport bearers may be mapped to AAL2 connections (in case of an ATM-based transport network) or UDP connections (in case of an IP-based transport network).

Figure 3:
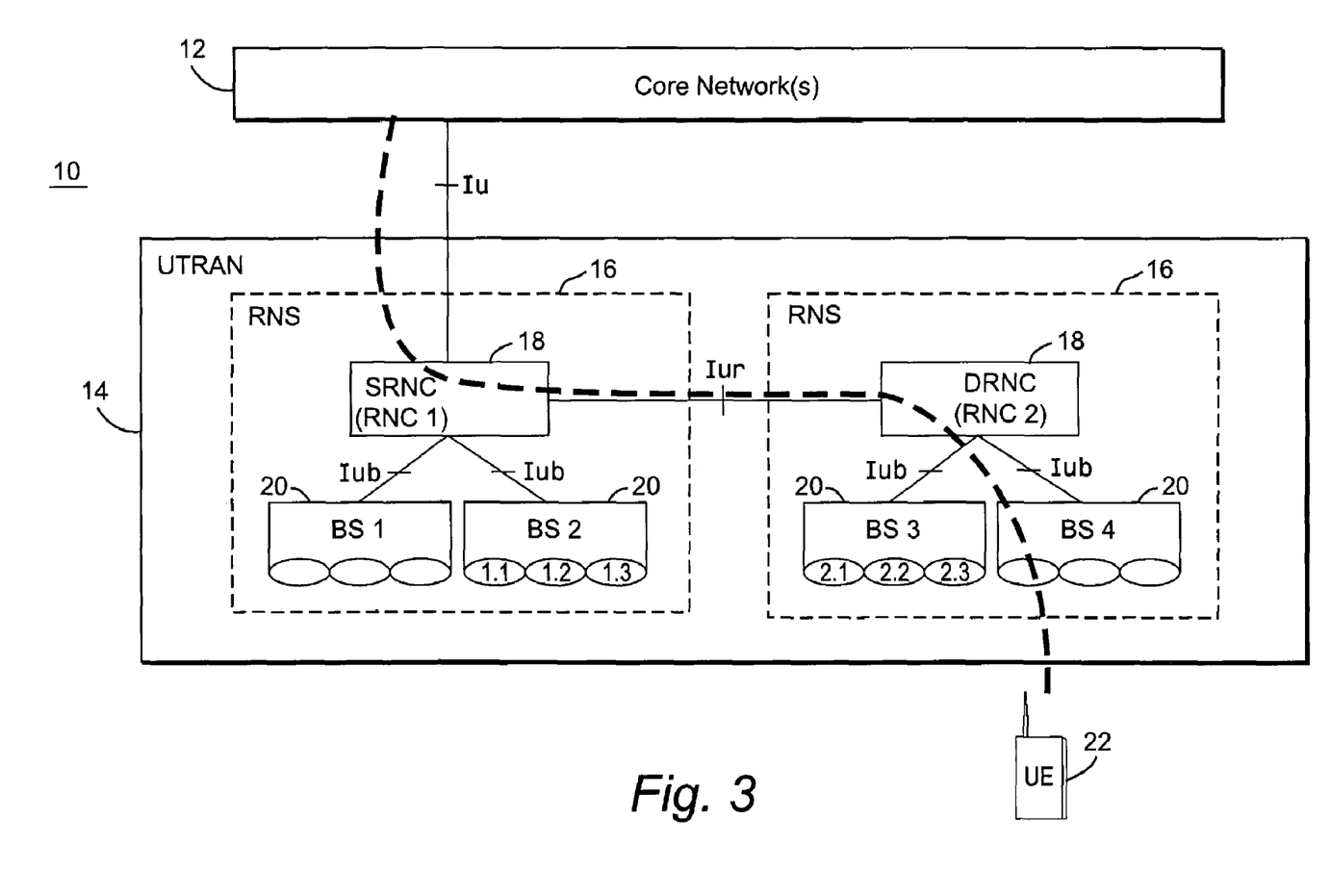
FIG. 3 illustrates an example cellular communications system in which the connection is established via the serving RNC is also supported by a drift RNC.

For a UTRAN—UE connection, an RNC can have the following roles: SRNC (Serving RNC) controlling the mobile UE within the UTRAN and DRNC (Drift RNC) supporting the SRNC with radio resources for a mobile UE connection that has moved to a cell controlled by the DRNC. The UTRAN 14 decides the role of an RNC (SRNC or DRNC) when the UE-RAN connection is being established. Normally, the RNC that controls the cell, where the connection to the UE is initially established, is assigned the SRNC role for this UE connection. As the UE moves, the connection is maintained by establishing radio communication via new cells, possibly also involving cells controlled by other RNCs. FIG. 3 shows a mobile UE connection established by an SRNC (RNC1) and subsequently supported by a DRNC (RNC2). For the purpose of illustrating the RNC roles, only the SRNC is shown with an interface to the core network (even though all RNCs have a core network Iu interface).

The uplink load situation at a specific base station can be characterized by the total received wideband power I relative to the power of the background noise N. This ratio is defined as the uplink noise rise I/N. Unfortunately, the uplink noise rise is difficult to directly measure in practice. An alternative is to estimate the noise rise using readily available measurements reported by mobile UEs' actively engaged in a UTRAN-UE connection.

For example, path gain measurements (or measurements from which path gain can be calculated) are regularly made by the UE. Specifically, the UE may measure the received signal strength of a base station pilot signal. The system information transmitted on the broadcast channel includes as part of its message the power level at which the pilot signal was transmitted from the base station. The downlink path gain is calculated in the UE by dividing the received signal strength by the base station transmitted power. Assuming that the path gain in the downlink (base station to UE) is approximately the same in the uplink (UE to base station), the uplink path gain can be determined using the received signal strength measured by the mobile UE. The mobile UEs could alternatively simply report received signal strength from which the SRNC could calculate the path gain by knowing the power level at which the pilot signals were transmitted. For purposes of simplifying the description only, it is here assumed that the mobile UE divides the received signal strength by the base station transmit power and reports the path gain.

A mathematical explanation is now provided to show how the mobile measured path gain can be used to estimate uplink load in a cell. Most physical quantities can be expressed using either logarithmic (e.g., dB or dBm) or linear scale. To avoid confusion, linearly scaled values are indicated with a bar. Thus, $\bar{g}_{ij}$ is a path gain value in linear scale and $g_{ij}$ the corresponding path gain value in logarithmic scale.

Consider an uplink situation in a cellular radio system with B cells. Assume that M active mobile stations are transmitting using the powers $\bar{p}_i(t)$, i=1, . . . , M. The signal power from mobile station i and received in cell j(j=1, . . . , B) is attenuated by the power or path gain $\bar{g}_{ij}(t)(<1)$. The uplink propagation situation in a cellular network can thus be described by the path gains, which together form an uplink gain matrix $$\bar{G}(t) = [\bar{g}_{ij}(t)] = \begin{pmatrix} \bar{g}_{11}(t) & \cdots & \bar{g}_{1B}(t) \\ \vdots & \ddots & \vdots \\ \bar{g}_{M1}(t) & \cdots & \bar{g}_{MB}(t) \end{pmatrix} \quad (1)$$

This matrix is most likely not square because there are more mobile stations than cells in a cellular radio system. If the mobile station i is connected to cell j this cell will experience a received carrier power $\bar{C}_i(t)=\bar{p}_i(t)\bar{g}_{ij}(t)$ from mobile i. All the received signals and thermal noise (with power $\bar{v}_j(t)$) at the cell combine to the total interference power (total received power):

$$\bar{I}_j^{tot}(t) = \bar{v}_j(t) + \sum_{i=1}^{M} \bar{g}_{ij}(t)\bar{p}_i(t) \quad (2)$$

The perceived uplink quality for the i:th mobile UE connected to the j:th cell is related to its carrier-to-interference ratio (CIR) defined by $$\bar{\gamma}_i(t) = \bar{C}_i(t)/(\bar{I}_i^{tot}(t) - \bar{C}_i(t)). \qquad (2)$$

For presentational ease, the carrier-to-total-interference ratio (CTIR) $\bar{\beta}_i(t) = \bar{C}_i(t)/\bar{I}_i^{tot}(t)$ is employed below. Since the received carrier power from one mobile is much less than the total received interference, (i.e., $\bar{C}_i(t) \ll \bar{I}_i^{tot}(t)$), it is a reasonable simplification to assume that $\bar{\beta}_i(t) \approx \bar{\gamma}_i(t)$. In a simplistic situation, the quality of a specific service, for example in terms of data rate or bit error rate, can be related to a required target CTIR, denoted $\bar{\beta}_i^t$ (or a target CIR denoted $\bar{\gamma}_i^t$). This target is reconsidered regularly by outer power control loops. The outer power control loop update rate is typically orders of magnitude faster than the admission control, and the changes are relatively small. Therefore, the target CTIR is considered constant.

An admitted mobile station is allocated a connection to a base station (typically, the one with most favorable propagation conditions, i.e., highest $\bar{g}_{ij}$), a waveform (in WCDMA, a code), and a transmission power $\bar{p}_i(t)$. The aim is to update the power so that CIR is equal to target CIR. Because power control is much faster than admission control, perfect power control is assumed so that the actual CIR equals the target.

WCDMA allows a mobile station to be connected to multiple cells associated with different base stations (soft handover) or to multiple cells associated with the same base station (softer handover). Denote the set of connected cells supporting a connection of mobile station i by $K_i$. In softer handover, the received signals can be optimally combined. Using maximum ratio combining, the CTIR is given by $$\bar{\beta}_i(t) \approx \bar{\gamma}_i(t) = \sum_{k \in K_i} \frac{\bar{g}_{ik}(t)\bar{p}_i(t)}{\bar{I}_k^{tot}(t)} \qquad (3)$$

Conversely, when connected to different base station cell as in soft handover, selection combining is used and the signal with the best quality measure is chosen.

The following derives a practical estimate of the relative uplink load where the time index t is suppressed to simplify the derivation. The maximal uplink load of cell in a sparsely planned second generation TDMA/FDMA system is solely determined by the number of frequency channels (times the number of time slots) at that cell. In densely planned systems such as a WCDMA system or a GSM system, the maximal uplink load is determined by the propagation situation between mobile and base stations. A number of approximations are adopted to obtain a relative load estimate based on available mobile measurements. Assume that the CTIR expression for softer handover in equation (3) is approximately true also for soft handover. The assumption is not that maximum ratio combining is used, but rather that it constitutes an approximate expression, which is more true when the mobile's active set is dominated by one connection. This yields $$\bar{\beta}_i = \bar{p}_i \sum_{k \in K_i} \frac{\bar{g}_{ik}}{\bar{I}_k^{tot}} \Leftrightarrow \bar{p}_i = \frac{\bar{\beta}_i}{\sum_{k \in K_i} \frac{\bar{g}_{ik}}{\bar{I}_k^{tot}}}, \forall i \qquad (4)$$

Combining Equations (2) and (4) and assuming perfect C/I based inner-loop power control (i.e., giving $\bar{\beta}_i = \bar{\beta}_i^t$) results in $$\bar{I}_j^{tot} = \bar{v}_j + \sum_{i=1}^{M} \bar{g}_{ij}\bar{p}_i = \bar{v}_j + \sum_{i=1}^{M} \frac{\bar{g}_{ij}\bar{\beta}_i^t}{\sum_{k \in K_i} \frac{\bar{g}_{ik}}{\bar{I}_k^{tot}}} \qquad (5)$$

Furthermore, a temporary approximation is made that the total interference powers at the different base stations are equal, $\bar{I}_k^{tot} = \bar{I}_j^{tot}$. Solving for $\bar{I}_j^{tot}$ yields $$\bar{I}_j^{tot} = \frac{\bar{v}_j}{1 - \sum_{i=1}^{M} \frac{\bar{\beta}_i \bar{g}_{ij}}{\sum_{k \in K_i} \bar{g}_{ik}}} \qquad (6)$$

The total interference at cell j is expressed as $$\bar{I}_j^{tot} = \frac{\bar{v}_j}{1 - \bar{L}_j}, \qquad (7)$$

The relative or fractional load $\bar{L}_j$ is an alternative representation of the ratio $\bar{I}_j^{tot}/\bar{v}_j$ corresponding to the noise rise.

$$\frac{\bar{I}_j^{tot}}{\bar{v}_j} = \frac{1}{1 - \bar{L}_j} \Leftrightarrow \bar{L}_j = 1 - \frac{1}{\bar{I}_j^{tot}/\bar{v}_j}. \qquad (8)$$

Using Equations (6) and (8), the relative uplink load estimate $\hat{\bar{L}}_j$ is determined which is based on available mobile path gain measurements and a target carrier-to-interference ratio.

$$\hat{\bar{L}}_j = \sum_{i=1}^{M} \frac{\bar{\beta}_i^t \bar{g}_{ij}}{\sum_{k \in K_i} \bar{g}_{ik}} \qquad (9)$$

The mobile UE reports its path gain measurements to its serving RNC via radio resource control (RRC) measurement reports. This measurement scheme works well within the context of a single RNC. With several RNCs in the UTRAN, however, this scheme has limitations. Consider a situation as illustrated by Table 1 in which six UEs with active connections established with RNC1 as the serving RNC provide measurement reports to RNC1. Mobile UEs served by other RNCs are not included.

TABLE 1

| SRNC = RNC 1 | RNC 2 |
| --- | --- |

| Active UEs | Cell 1.1 | Cell 1.2 | Cell 1.3 | Cell 2.1 | Cell 2.2 | Cell 2.3 |
|---|---|---|---|---|---|---|
| UE 1.1 | as, m, c | c | c | c | c | c |
| UE 1.2 | as, m, c | m, c | m, c | c | c | c |
| UE 1.3 | m, c | as, m, c | m, c | m, c | c | c |
| UE 1.4 | c | m, c | as, m, c | as, m, c | m, c | c |
| UE 1.5 | c | c | c | as, m, c | c | c |
| UE 1.6 | c | c | c | as, m, c | m, c | c |

All mobile UEs 1.1–1.6 are contributing ("c") to the uplink load at all base station cells, but measurements are not available relative to all base station cells. Measurements ("m") are made for base station cells where the load contribution is significant, i.e., to cells with high path gain. All measurements "m" are routed back to the SRNC corresponding to RNC1. RNC2 is unaware of those measurement reports. One or more cells are included in a mobile UE's active set "as." An active set cell has an active connection with the mobile UE. In diversity handover (soft or softer handover), the mobile UE will have two or more cells in its active set. Mobile UE 1.4 is an example of a diversity handover connection with both cell 1.3 and cell 2.1 being in its active set.

Mobile UEs 1.1 and 1.2 do not provide measurements relative to any base station cells controlled by RNC 2, and therefore, the load contribution to those cells cannot be estimated using mobile path gain measurements. Mobile UEs 1.4, 1.5, and 1.6 include cell 2.1 in their respective active sets. RNC 2 is thus aware of the existence of these three UE's in cell 2.1. Since these three UE connections go through RNC 2 to the serving RNC 1, and since they are power controlled by a base station that is controlled by RNC 2, RNC 2 can estimate their uplink load contribution in cell 2.1. However, mobile UEs 1.3, 1.4, and 1.6 also provide measurements "m" indicating the load contribution to other cells controlled by RNC 2. This information initially resides only in the serving RNC1.

Figure 4:
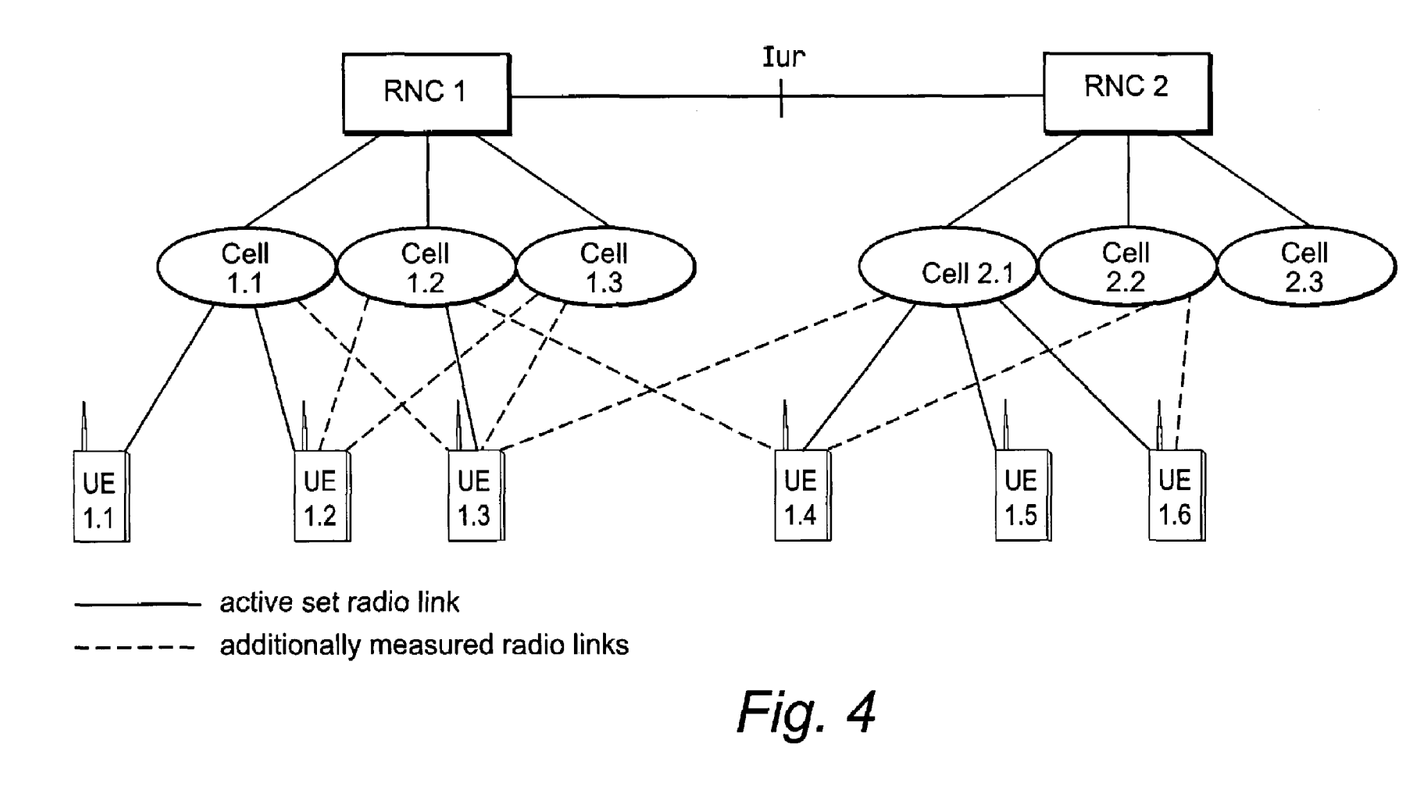
FIG. 4 shows six mobile UEs with connections established via serving RNC1 showing active set connections and measurement reports associated with various cells.

FIG. 4 illustrates radio link measurement information sent from various mobile UEs in Table 1 to the network A mobile UE makes path gain measurements (shown as dashed lines) for certain cells that are not in its active set. Those measurements are reported to the network over an active radio link shown as a solid line. For instance, UE 1.3 sends its measurement report to RNC1 via its active set radio link with cell 1.2. That report includes path gain measurement information for cells 1.1, 1.3, and 2.1. Because all mobile UEs in FIG. 4 have RNC 1 as their serving RNC, all of their measurement reports are routed back to RNC 1. Even the measurement reports relating to cells 2.1 and 2.2 controlled by RNC 2 are routed through RNC 2 back to RNC 1. It should be understood that for mobiles having an active set radio link to any cell controlled by RNC 2, the measurement report including the path gain to cells 2.1 and 2.2 only passes through the RNC 2 without any extraction of the message content by RNC 2. When a mobile UE has an active set connection with a cell (shown as a solid line), the mobile UE's measurement report routed to the SRNC includes path gain values for that cell as well.

In general, uplink load information stored in the serving RNC is communicated to other affected RNCs so they have a more accurate picture to the total uplink load in their affected cells. In one example embodiment, the serving RNC signals over the Iur interface the uplink load contribution from all its served UEs' to all affected cells controlled by another RNC. For the example in Table 1, RNC 1 signals this information to RNC 2.

Figure 5:
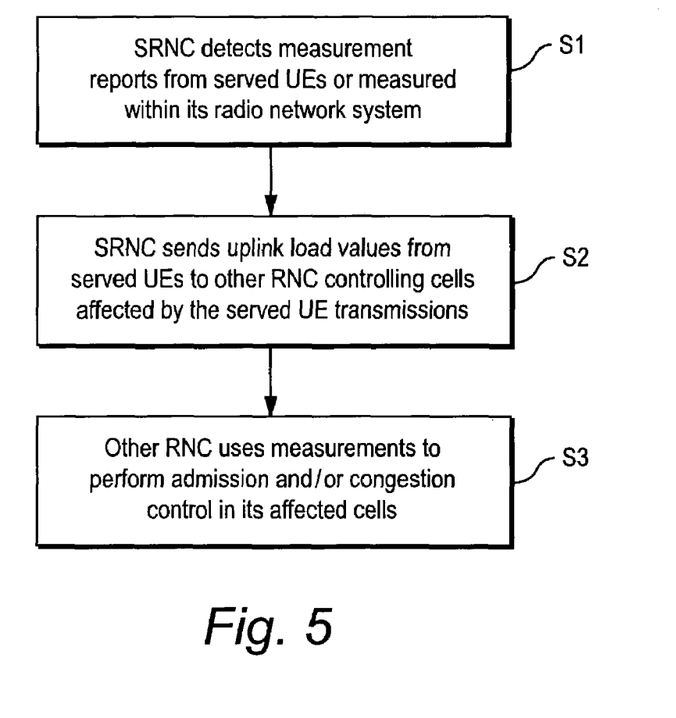
FIG. 5 illustrates UE measurement handling procedures in flowchart form.
Figure 6:
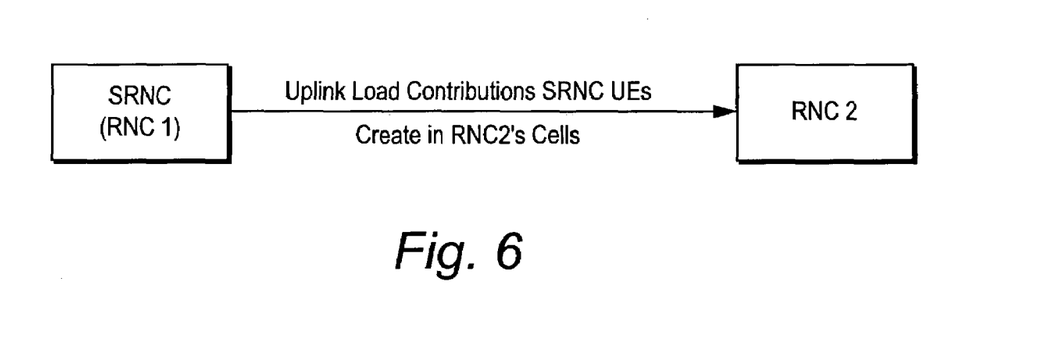
FIG. 6 illustrates an example signaling message sent from the serving RNC1 to the RNC2.

Reference is made to the flowchart in FIG. 5. The serving RNC detects (1) measurement reports from served UEs or (2) SRNC internally measured values like UE traffic activity as described more below (step S1). The SRNC sends served UE uplink load values or contributions (based on served UE measurement reports or determined by the SRNC) to one or more other RNCs having cells affected by the served UE uplink transmissions (step S2). The serving RNC may send the load values/contributions to other RNC(s) using any suitable messaging protocol at any suitable timing. FIG. 6 shows an example Uplink Load Contributions message sent from the serving RNC 1 to RNC 2. For example, the messaging format specified in the relevant 3GPP protocol section maybe employed. In terms of timing, mobile UE measurements maybe sent on-demand or by request from the other RNC, periodically, when received from the mobile UEs, when some other event occurs, etc.

The other RNC uses the mobile UE measurements received from the serving RNC to perform admission control and/or congestion control in each of its affected cells (step S3). For example, the RNC may compare a total uplink load to a threshold value. If the threshold is exceeded, new connections may not be admitted. In addition, the RNC may take steps to actively reduce the load by reducing quality of service for one or more existing connections. This could be done for example by ordering a number of mobile LEs to decrease their transmission bitrate or by even disconnecting a number of mobile users.

The measurement and reporting steps described in FIG. 5 are now applied to the specific example in Table 1. RNC 1 signals the total uplink load contributions of all the mobiles served by RNC 1 on each cell controlled by RNC 2. Specifically, RNC 1 signals the two uplink load values to RNC 2 its mobile UEs 1.1–1.6 create in cell 2.1 and in cell 2.2, respectively.

Different types of load values may be calculated and conveyed depending on the desired accuracy and permissible complexity. In the example, non-limiting embodiment, the load estimate is based on the measured path relationships set forth above. The power gain from mobile i to base station j is denoted by $\bar{g}_{ij}$. Quality of service is related to the target carrier-to-total-interference ratio $\bar{\beta}_i^t$, a known value at the serving RNC. The set of cells which mobile i is connected to is denoted $K_i$. For mobiles in macro diversity handover, the set $K_i$ contains cells from more than one base station. The uplink load estimate $\hat{L}_j$ at base station j is given, as in eq. (9), by:

$$\hat{L}_j = \sum_{i=1}^{M} \frac{\bar{\beta}_i^t \bar{g}_{ij}}{\sum_{k \in K_i} \bar{g}_{ik}} \quad (10)$$

This uplink load estimate can be computed using path gain measurements from the mobile UEs together with knowledge of the target (tgt) CIR $\bar{\beta}_i^{tgt}$. The uplink loads in cell 2.1 and cell 2.2 caused by active mobiles served by RNC 2 are estimated in RNC 2 because that is where the path gain measurement information regarding mobiles served by RNC 2 resides. However, path gain measurement information from mobiles served by RNC1 (all of the UEs listed in Table 1) resides in that RNC 1. The estimated uplink load of cell 2.1 maybe expressed as:

$$\hat{L}_{Cell\,2.1} = \text{Contributions from mobiles served by } RNC\,2 + \ldots + \quad (11)$$

$$\bar{\beta}_{UE1.3}^{tgt} \frac{\bar{g}_{UE1.3,cell\,2.1}}{\bar{g}_{UE1.3,cell\,1.2}} + \bar{\beta}_{UE1.4}^{tgt} \frac{\bar{g}_{UE1.4,cell\,2.1}}{\bar{g}_{UE1.4,cell\,1.3} + \bar{g}_{UE1.4,cell\,2.1}} +$$

$$\bar{\beta}_{UE1.5}^{tgt} + \bar{\beta}_{UE1.6}^{tgt}$$

RNC 2 already knows the uplink load contributions of the mobiles served by RNC2. The second line in equation (11) describes the aggregate uplink load contribution by mobile UEs served by RNC1 to the load of cell 2.1. The uplink load contributions of UE 1.1 and UE 1.2 are unknown because neither UE has provided path gain measurements for cell 2.1. Most probably, their contribution can be neglected. The uplink load contributions from UE 1.3 and UE 1.4 to cell 2.1 depend on the path loss to cell 1.2, cell 1.3, and cell 2.1 for these two mobile UEs. For UE 1.3, the path gain to the cell of interest, cell 2.1, is divided by the path gain to the cell that power-controls UE 1.3 cell 1.2. For UE 1.44, the path gain to the cell of interest, cell 2.1, is divided by the sum of the path gains of the two cells that power-control UE 1.3, cell 1.3 and cell 2.1. Because UE 1.5 and UE 1.6 include cell 2.1 in their respective active sets, the path gain ratios for UE 1.5 and UE 1.6 for cell 2.1 are one and their contribution depends only on their respective target signal-to-interference ratios $\bar{\beta}_i^{tgt}$, which is actually known in RNC2.

So for this example, the serving RNC 1 would signal the sum of the four terms on the second line of the equation to RNC 2. RNC 2 adds that sum to the first term in equation (11) and obtains a measure of the uplink load in cell 2.1 $\hat{L}_{Cell\,2.1}$. Alternatively, because the uplink load contributions from UE 1.5 and UE 1.6 depend only on the target signal-to-interference ratio $\bar{\beta}_i^{tgt}$, a value which is already known by RNC 2, RNC 1 may only signal the sum of the first and second terms on the second line of equation (11) to RNC 2. RNC 2 adds $\bar{\beta}_{UE\,1.5}^{tgt} + \bar{\beta}_{UE\,1.6}^{tgt}$ to obtain $\hat{L}_{cell\,2.1}$.

In general, the uplink load contribution from all served mobile UEs' to all affected cells controlled by a different RNC is provided from the serving RNC to the other RNC. Although the above example uses path gain measurements as uplink load values, other load values maybe employed. For example, the load value may be based on uplink traffic activity of the users that contribute to the uplink load in cells controlled by another RNC. The uplink load depends on how much each mobile UE actually uses its assigned channel. For speech, the activity factor is fairly stable. Around 30–50% of the time a speech user actually talks (uses) the channel. But for data services, the activity may vary considerably for different users and even over time for the same user. For instance, some data users may transmit large data files in the uplink direction, which creates a large UL noise rise, while others only send small requests for server-based, downlink-dominated traffic like web browsing.

Like the UE path gain measurements, the mobile UE activity is most conveniently determined in and obtained from the serving RNC, although it may also be determined in a drift RNC, but with more difficulty. So mobile UE activity is another example of valuable uplink load information that resides in one RNC, but is needed in a different RNC In this case, mobile activity information available in the serving RNC is signaled to another affected RNC to permit the other RNC to formulate a more accurate and complete picture of uplink load in its cells. Alternatively, the serving RNC could send cell load measures including both path gain and UE activity measurements to the affected RNCs. Each term on the second row in the equation above maybe multiplied with the corresponding activity factor for each UE (i.e., UEs 1.3, 1.4, 1.5 and 1.6) to obtain that cell load measure.

A third example of information that could be employed to improve the uplink cell load measures but may reside in the "wrong RNC" is the uplink CIR or (CTIR) value. As mentioned before, there is a so-called outer loop power control loop that regularly considers and updates the CIR (or CTIR) target values in order to keep the connection quality at the required level. Typically, the quality is measured in block error rate (BLER), which is the number of erroneously received data blocks divided by the total number of received data blocks. If BLER increases above the acceptable required BLER, the outer loop power control increases the CIR target value, and if unnecessary quality is provided (generating unnecessarily high interference to other users), the outer loop power control decreases the CIR target value for that user. Since the decoding of data blocks is performed in the SRNC, the CIR target values for the mobiles served by that RNC are calculated in the SRNC.

Hence, CIR target values are another example of information that resides in the one RNC but would be useful in another RNC. Specifically, continuously updated CIR target values ($\bar{\beta}_i^t$ values) for the mobiles served by RNC 1 are not present in RNC 2. So in the example above, the correct and up-to-date $\bar{\beta}_i^t$ values for UEs 1.3, 1.4, 1.5, and 1.6 are only known in RNC 1. (Actually, the RNC 2 receives an initial $\bar{\beta}_i^t$ value for the mobiles for which it sets up an active set radio link (i.e., UE 1.4, 1.5 and 1.6), but the $\bar{\beta}_i^t$ updates during the connection time are not normally known to RNC2). Accordingly, the $\bar{\beta}_i^t$ value updates may also be uplink load values signaled between SRNC to another RNC. Generalizing equation (11), with an arbitrary load estimate (or "load value"), the estimated total load of a cell j, controlled by any RNC, can be expressed as:

$$\hat{L}_j = f(\hat{L}_{j,RNC1}, \hat{L}_{j,RNC2}, \ldots, \hat{L}_{j,RNCn}) \quad (12)$$

i.e., an aggregate of contributions from mobiles with different serving RNCs. If one assumes that cell j is cell 2.1, and thus is controlled by RNC 2, the example above is obtained. $\hat{L}_{j,RNC1}$ is then the sum of the four terms on the second line of the equation (11), (or only the first two terms of the second line), and is signaled to RNC 2. Signaling load contribution information between RNCs allows the information receiving RNCs to obtain a more complete and accurate picture of the uplink load situation in their respective cells. Again, any suitable protocol and/or triggering mechanism could be used to signal the load information.

The load estimates maybe expressed in different formats in the signaling between RNCs. One way to express it would be in "contributing interference power" in cell j, expressed in units of linear terms [W or mW] or logarithmic terms [dBW or dBm]. Another example signaling format would be in terms of "percentage of maximum acceptable uplink load."

While the present invention has been described with respect to particular embodiments, those skilled in the art will recognize that the present invention is not limited to these specific exemplary embodiments. Different formats, embodiments, and adaptations besides those shown and described as well as many variations, modifications, and equivalent arrangements may also be used to implement the invention. Therefore, while the present invention has been described in relation to its preferred embodiments, it is to be understood that this disclosure is only illustrative and exemplary of the present invention. Accordingly, it is intended that the invention be limited only by the scope of the claims appended hereto.

What is claimed is:

1. A method for use in a mobile communications network including a first radio network controller (RNC) controlling first cells and a second radio network controller (RNC) controlling second cells, the method comprising:
   plural mobile radios having initially established respective communication connections in one of the first cells;
   the first RNC providing to the second RNC information associated with an uplink load contribution of each of the plural mobile radios on one or more of the second cells, the provided information including a relative path gain ratio of a relative path gain from one of the mobile radios to one of the second cells to a relative path gain from the one mobile radio to one or more of the cells to which the one mobile radio has a power controlled connection; and
   the second RNC using the provided information in determining an uplink load level in one or more of the second cells.

2. The method in claim 1, wherein the first RNC is a serving RNC and the second RNC is a drift RNC serving one or more of the mobile radio connections with radio resources from one or more of the second cells.

3. The method in claim 1, wherein the first RNC is a serving RNC and receives measurement reports from one or more of the mobile radios, and wherein one of mobile radio measurement reports relates to a measurement associated with one or more of the second cells.

4. The method in claim 3, further comprising:
   the serving RNC receiving measurement reports from one or more of the mobile radios periodically, upon the occurrence of an event, or in response to a request from the serving RNC.

5. The method in claim 1, wherein the first RNC provides path gain information, wherein the path gain information includes path gain values or values from which path gain values may be determined.

6. The method in claim 1, wherein the first RNC provides mobile radio activity information or target signal quality information.

7. The method in claim 1, wherein the first RNC provides one or more of the following: path gain information, mobile radio activity information, and target signal quality information.

8. The method in claim 1, wherein the first RNC provides path gain information, and wherein the path gain information includes a target signal-to-interference ratio associated with the reporting mobile radio.

9. The method in claim 1, further comprising:
   the second RNC performing admission or congestion control in the one or more second cells using the determined uplink load information.

10. A radio access network comprising:
    a first radio network controller (RNC) for controlling radio resource operations in first cells, and
    a second radio network controller (RNC) for controlling radio resource operations in second cells,
    wherein the first RNC is configured to control establishing radio connections with mobile radios and to provide to the second RNC information associated with an uplink load contribution of each of the mobile radios on one or more of the second cells, the provided information including a relative path gain ratio of a relative path gain from one of the mobile radios to one of the second cells to a relative path gain from the one mobile radio to one or more of the cells to which the one mobile radio has a power controlled connection, and
    wherein the second RNC is configured to use the provided information in determining an uplink load level in one or more of the second cells.

11. The radio access network in claim 10, wherein the first RNC is a serving RNC and the second RNC is a drift RNC serving one or more of the mobile radio connections with radio resources from one or more of the second cells.

12. The radio access network in claim 10, wherein the first RNC is a serving RNC and is configured to receive measurement reports from one or more of the mobile radios, and wherein one of mobile radio measurement reports relates to a measurement associated with one or more of the second cells.

13. The radio access network in claim 12, wherein the serving RNC is configured to receive measurement reports from one or more of the mobile radios periodically, upon the occurrence of an event, or in response to a request from the serving RNC.

14. The radio access network in claim 10, wherein the first RNC is configured to provide path gain information, wherein the path gain information includes path gain values or values from which path gain values may be determined.

15. The radio access network in claim 10, wherein the first RNC is configured to provide mobile radio activity information or target signal quality information.

16. The radio access network in claim 10, wherein the first RNC is configured to provide one or more of the following: path gain information, mobile radio activity information, and target signal quality information.

17. The radio access network in claim 10, wherein the first RNC is configured to provide path gain information, and wherein the path gain information includes a target signal-to-interference ratio associated with the reporting mobile radio.

18. The radio access network in claim 10, wherein the second RNC is configured to perform admission or congestion control in the one or more second cells using the determined uplink load information.

19. A radio network controller (RNC) for controlling first cells associated with a radio access network, the RNC configured to perform the following tasks:
    control establishing radio connections between mobile radios located in one of the first cells, and
    provide to another RNC information associated with an uplink load contribution of each of the mobile radios on one or more of second cells controlled by the other RNC,
    wherein the information includes a relative path gain ratio of a relative path gain from one of the mobile radios to one of the second cells to a relative path gain from the one mobile radio to one or more of the cells to which the one mobile radio has a power controlled connection.

20. The RNC in claim 19, wherein the RNC is a serving RNC and is configured to receive measurement reports from one or more of the mobile radios, and wherein one of mobile radio measurement reports relates to a measurement associated with one or more of the second cells.

21. The RNC in claim 20, wherein the serving RNC is configured to receive measurement reports from one or more of the mobile radios periodically, upon the occurrence of an event, or in response to a request from the serving RNC.

22. The RNC in claim 20, wherein the serving RNC is configured to provide path gain information, wherein the path gain information includes path gain values or values from which path gain values may be determined.

23. The RNC in claim 20, wherein the serving RNC is configured to provide mobile radio activity information or target signal quality information.

24. The RNC in claim 20, wherein the serving RNC is configured to provide one or more of the following: path gain information, mobile radio activity information, and target signal quality information.

25. The RNC in claim 20, wherein the serving RNC is configured to provide path gain information, and wherein the path gain information includes a target signal-to-interference ratio associated with the reporting mobile radio.

* * * * *